United States Patent
Stevenson et al.

(10) Patent No.: US 9,904,412 B2
(45) Date of Patent: Feb. 27, 2018

(54) DISPLAY NOISE SUBTRACTION VIA SUBSTANTIALLY ORTHOGONAL NOISE TEMPLATES

(71) Applicant: Synaptics Incorporated, San Jose, CA (US)

(72) Inventors: Matthew Stevenson, San Jose, CA (US); Felix Schmitt, Oakland, CA (US)

(73) Assignee: Synaptics Incorporated, San Jose, CA (US)

( * ) Notice: Subject to any disclaimer, the term of this patent is extended or adjusted under 35 U.S.C. 154(b) by 23 days.

(21) Appl. No.: 14/985,063

(22) Filed: Dec. 30, 2015

(65) Prior Publication Data

US 2017/0192604 A1    Jul. 6, 2017

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01)

(58) Field of Classification Search
CPC ........ G06F 3/0418; G06F 3/041; G06F 3/044; G01R 27/26; G01R 27/2605; H03K 17/955
See application file for complete search history.

(56) References Cited

U.S. PATENT DOCUMENTS

| | | | | |
|---|---|---|---|---|
| 9,323,385 | B2* | 4/2016 | Van Antwerpen | G06F 3/0418 |
| 9,568,526 | B2* | 2/2017 | Voris | G01R 27/2605 |
| 2011/0031042 | A1* | 2/2011 | Wu | G06F 3/0412 |
| | | | | 178/18.06 |
| 2013/0033451 | A1* | 2/2013 | Olson | G06F 3/044 |
| | | | | 345/174 |
| 2014/0071095 | A1* | 3/2014 | Godsill | G06F 3/0418 |
| | | | | 345/177 |
| 2014/0267131 | A1* | 9/2014 | Elia | G06F 3/044 |
| | | | | 345/174 |
| 2015/0338448 | A1* | 11/2015 | Kuo | G01R 29/26 |
| | | | | 324/613 |
| 2016/0274730 | A1* | 9/2016 | Fosler | G06F 3/044 |

* cited by examiner

*Primary Examiner* — Jennifer Mehmood
*Assistant Examiner* — Sardis F Azongha
(74) *Attorney, Agent, or Firm* — Osha Liang LLP

(57) ABSTRACT

In a method of determining noise templates for use in capacitive sensing, a plurality of changes of capacitance are acquired, which include noise components, from a plurality of sensor electrodes in a sample capacitive sensor. Each of a plurality of substantially orthogonal noise templates is determined based on the acquired plurality of changes in capacitance. Multiple substantially orthogonal noise templates are selected, from the plurality of substantially orthogonal noise templates, to be used as a set of substantially orthogonal noise templates for reduction of the noise components of the acquired plurality of changes of capacitance.

25 Claims, 13 Drawing Sheets

1300

ACQUIRING A PLURALITY OF CHANGES OF CAPACITANCE, WHICH INCLUDE NOISE COMPONENTS, FROM A PLURALITY OF SENSOR ELECTRODES IN A SAMPLE CAPACITIVE SENSOR
1310

DETERMINING, EACH OF A PLURALITY OF SUBSTANTIALLY ORTHOGONAL NOISE TEMPLATES BASED ON THE PLURALITY OF CHANGES IN CAPACITANCE
1320

SELECTING MULTIPLE SUBSTANTIALLY ORTHOGONAL NOISE TEMPLATES, FROM THE PLURALITY OF SUBSTANTIALLY ORTHOGONAL NOISE TEMPLATES, TO BE USED AS A SET OF SUBSTANTIALLY ORTHOGONAL NOISE TEMPLATES FOR REDUCTION OF THE NOISE COMPONENTS OF THE PLURALITY OF CHANGES OF CAPACITANCE
1330

STORING THE SET OF SUBSTANTIALLY ORTHOGONAL NOISE TEMPLATES FOR FUTURE USE WITH CAPACITIVE SENSORS OF THE SAME TYPE AS THE SAMPLE CAPACITIVE SENSOR
1340

APPROXIMATING EACH SUBSTANTIALLY ORTHOGONAL NOISE TEMPLATE IN THE SET OF SUBSTANTIALLY ORTHOGONAL NOISE TEMPLATES WITH A SINE WAVE TO FORM A SET OF SUBSTANTIALLY ORTHOGONAL SINE WAVE NOISE TEMPLATES
1350

STORING THE SET OF SUBSTANTIALLY ORTHOGONAL SINE WAVE NOISE TEMPLATES FOR FUTURE USE WITH A CAPACITIVE SENSING REGION OF THE SAME TYPE AS THE SAMPLE CAPACITIVE SENSOR
1360

ACQUIRING A PLURALITY OF CHANGES OF CAPACITANCE, WHICH INCLUDE NOISE COMPONENTS, FROM A PLURALITY OF SENSOR ELECTRODES IN A SENSING REGION OF A CAPACITIVE SENSOR
1410

MODIFYING THE PLURALITY OF CHANGES OF CAPACITANCE UTILIZING, SUCCESSIVELY AND INDEPENDENTLY, EACH OF A PLURALITY OF SUBSTANTIALLY ORTHOGONAL NOISE TEMPLATES WHICH HAVE BEEN SELECTED FROM A SET OF AVAILABLE NOISE TEMPLATES
1420

DETERMINING PRESENCE OF AN INPUT OBJECT IN THE SENSING REGION BASED ON THE MODIFIED PLURALITY OF CHANGES OF CAPACITANCE
1430

FIG. 14

DISPLAY NOISE SUBTRACTION VIA SUBSTANTIALLY ORTHOGONAL NOISE TEMPLATES

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch/proximity screens integrated in cellular phones, tablet computers, and other electronic systems). Such touch/proximity screen input devices are typically superimposed upon or otherwise collocated with a display of the computing system. Touch/proximity screen input devices can experience interference, which may include display coupled interference, when receiving input signals.

SUMMARY

In a method embodiment of determining noise templates for use in capacitive sensing, a plurality of changes of capacitance are acquired, which include noise components, from a plurality of sensor electrodes in a sample capacitive sensor. Each of a plurality of substantially orthogonal noise templates is determined based on the acquired plurality of changes in capacitance. Multiple substantially orthogonal noise templates are selected, from the plurality of substantially orthogonal noise templates, to be used as a set of substantially orthogonal noise templates for reduction of the noise components of the acquired plurality of changes of capacitance. Aspects of this method may be implemented, in various embodiments, by one or more computer systems and/or processing systems which operate to acquire the changes of capacitance and to determine the plurality of substantially orthogonal noise templates and/or to select which of the plurality of substantially orthogonal noise templates to be used as the set of substantially orthogonal noise templates for reduction of the noise components of the acquired plurality of changes of capacitance.

In a method embodiment of capacitive sensing, a plurality of changes of capacitance, which include noise components, are acquired from a plurality of sensor electrodes in a sensing region of a capacitive sensor. The plurality of changes of capacitance are modified utilizing, successively and independently, each of a plurality of substantially orthogonal noise templates which have been selected from a set of available noise templates. Presence of an input object in the sensing region is determined based on the modified acquired plurality of changes of capacitance. In various embodiments, this method can be implemented by a processing system for a capacitive sensing input device. The processing system may be disposed in or configured for use with or disposition in a capacitive sensing input device.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIGS. 13A, 13B, and 13C illustrate a flow diagram of an example method of determining noise templates for use in capacitive sensing, according to various embodiments.

FIG. 14 illustrates a flow diagram of an example method of capacitive sensing, according to various embodiments.

DESCRIPTION OF EMBODIMENTS

Figure 1:
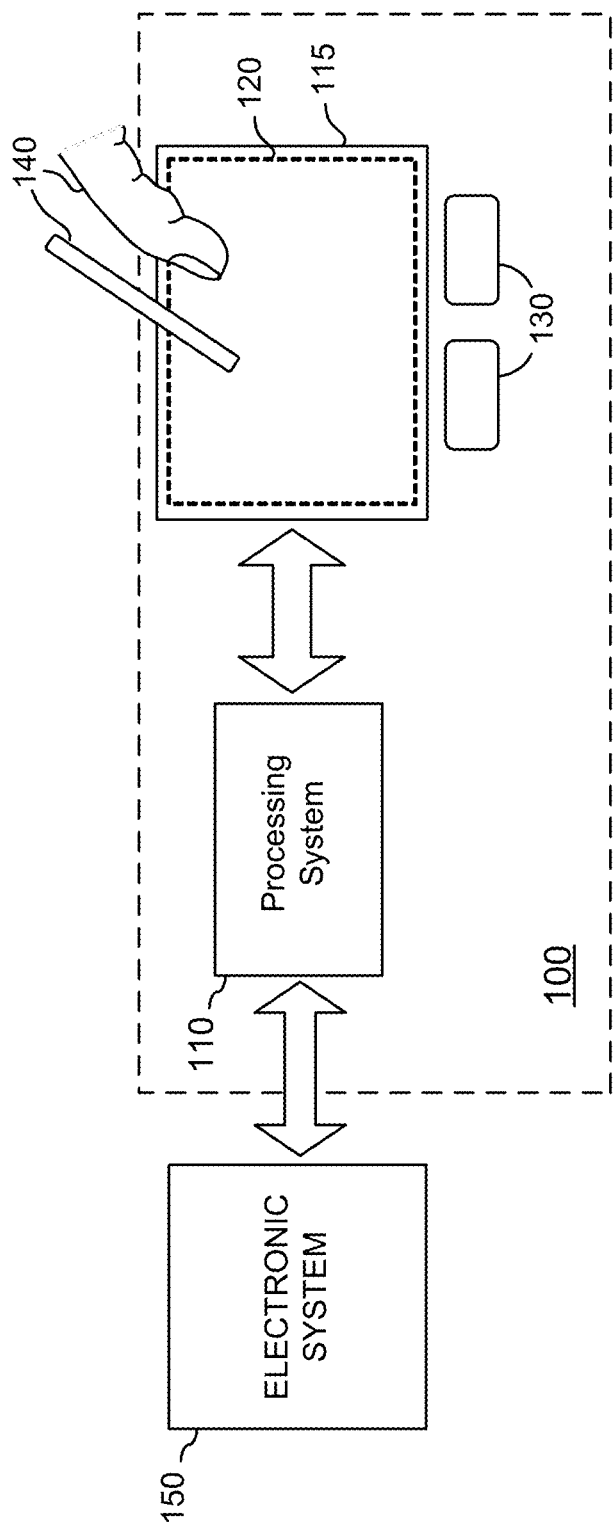
FIG. 1 is a block diagram of an example input device, in accordance with embodiments.

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. Utilizing techniques described herein, efficiencies may be achieved by determining and/or applying multiple substantially orthogonal noise templates for display noise subtraction. In a proximity/touch screen embodiment this decreases noise, which includes display coupled noise, that may be received or acquired contemporaneously with the acquisition of changes in capacitance on sensor electrodes in a sensor region. The display coupled noise is often present due to the display and the sensor electrodes for a capacitive sensor being in close proximity (often overlapping or even co-mingled) in an electronic system or electronic device such as a capacitive sensing input device. Display noise is caused by capacitive coupling between touch/proximity sensing electrodes and electronics of a display. Subtraction of display noise results in more robust and reliable data that can be better used to determine the presence and/or location of an input object in the sensing region of a capacitive sensor. In conventional models of such systems, display noise is assumed to be constant and a single noise templated is utilized in an attempt to subtract it. However, as described herein, multiple substantially orthogonal noise templates can be determined; then two or more of these substantially orthogonal noise templates can be independently and successively fitted to and subtracted, on a cumulative basis, from the acquired resulting signals. This independent and successive fitting and subtraction is computationally beneficial in that it will not burden a processor with excessive computational demands by trying to simultaneously fit and subtract several noise templates to a set of data. The techniques described herein can be used with any resulting signals that are acquired during capacitive sensing (e.g., absolute capacitive resulting signals, transcapacitive resulting signals, and/or resulting signals that are used in hybrid capacitive sensing).

Discussion begins with a description of an example input device with which or upon which various embodiments described herein may be implemented. An example sensor electrode pattern is then described. This is followed by description of an example processing system and some components thereof. The processing system may be utilized with or as a portion of an input device, such as a capacitive sensing input device. Example techniques for determining substantially orthogonal noise templates for use in capacitive sensing are described using two examples along with examples for applying multiple of the acquired substantially orthogonal noise templates to a plurality of changes of capacitance, which include display noise components, that were acquired from a plurality of sensor electrodes. Operation of the input devices, processing systems, and components thereof are then further described in conjunction with description of an example method of determining noise templates for use in capacitive sensing. Finally, operation of the input devices, processing systems, and components thereof are then further described in conjunction with description of an example method of capacitive sensing.

Example Input Device

Turning now to the figures, FIG. 1 is a block diagram of an example input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As several non-limiting examples, input device 100 may use acoustic, ultrasonic, capacitive, elastive, resistive, inductive, and/or optical techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In some embodiments, one or more receiver electrodes may be operated to receive a resulting signal when no transmitter electrodes are transmitting (e.g., the transmitters are disabled or else are not transmitting for purposes of capacitive sensing). In this manner, the resulting signal represents noise detected in the operating environment of sensing region 120. This noise may include display coupled noise. In this manner, in some embodiments, the resulting signal represents noise detected in the operating environment of sensing region 120. For example, display noise of a nearby or co-located (e.g., overlapping) display may be represented in the resulting signal that is received during absolute or transcapacitive sensing. Noise may be similarly detected at other times when transmitters are transmitting.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance (i.e., transcapacitive) sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor modules configured to operate sensing element(s) or other structures to detect input and determination modules configured to determine positions of any inputs objects detected. For example, a sensor module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as Graphic User Interface (GUI) actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. As one example, "zero-dimensional" positional information includes near/far or contact/no contact information. As another example, "one-dimensional" positional information includes positions along an axis. As yet another example, "two-dimensional" positional information includes motions in a plane. As still another example, "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch/proximity screen, and sensing region 120 overlaps at least part of an active area of a display screen 115. For example, input device 100 may comprise substantially transparent sensor electrodes overlaying the display screen and provide a touch/proximity screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Example Sensor Electrode Pattern

Figure 2:
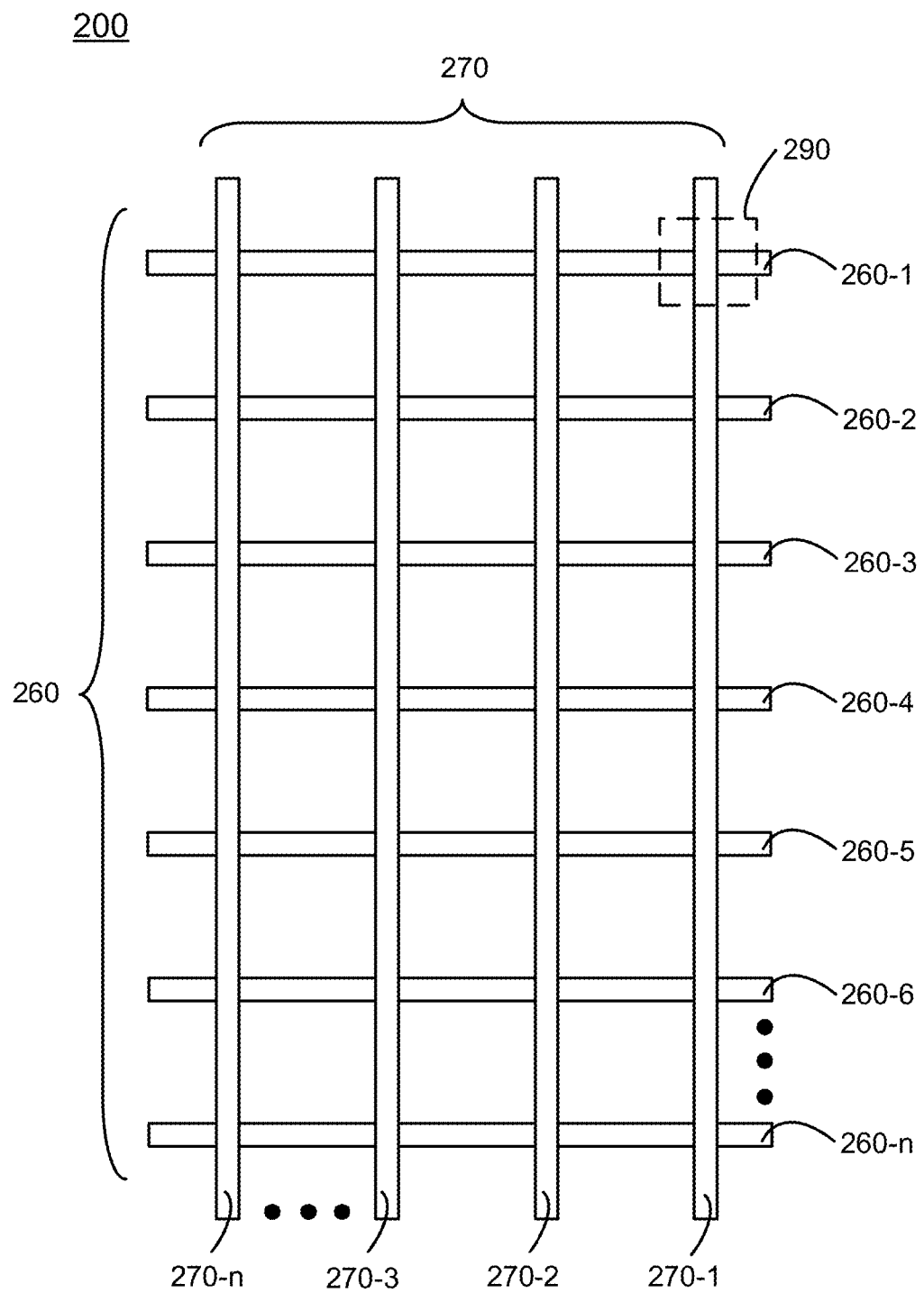
FIG. 2 shows a portion of an example sensor electrode pattern which may be utilized in a sensor to generate all or part of the sensing region of an input device, such as a touch/proximity screen, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated. It is appreciated that numerous other sensor electrode patterns may be employed with the techniques described herein, including but not limited to: patterns with a single sensor electrode; patterns with a single set of sensor electrodes; patterns with two sets of sensor electrodes disposed in a single layer (without overlapping); patterns with two sets of sensor electrodes disposed in a single layer employing jumpers at crossover regions between sensor electrodes; patterns that utilize one or more display electrodes of a display device such as one or more segments of a common voltage ($V_{COM}$) electrode; patterns with one or more of source electrodes, gate electrodes, anode electrodes, and cathode electrodes; and patterns that provide individual button electrodes.

The illustrated sensor electrode pattern is made up of a first plurality of sensor electrodes 270 (270-1, 270-3, 270-3 ... 270-n) and a second plurality of sensor electrodes 260 (260-1, 260-2, 260-3, 260-4, 260-5, 260-6 ... 260-n) which overlay one another, in this example. In many embodiments, processing system 110 is configured to operate the second plurality of sensor electrodes 260 as transmitter electrodes by driving them with transmitter signals and the first plurality of sensor electrodes 270 as receiver electrodes by receiving resulting signals with them. Other embodiments, may reverse the roles of sensor electrodes 260 and 270. In the illustrated example, sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels where transmitter electrodes 260 and receiver electrodes 270 cross or interact to measure a transcapacitance.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-1 may be charged and then the capacitance of sensor electrode 270-1 may be measured. In such an embodiment, an input object 140 interacting with sensor electrode 270-1 alters the electric field near sensor electrode 270-1, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may continue to use its designation as a transmitter electrode or a receiver electrode even though they are used in the same manner during absolute capacitive sensing.

Capacitive images and absolute capacitance measurements can be adjusted for the background capacitance of the sensor device for more efficient processing. For example, various techniques may be employed internal and/or external to an ASIC/processing system to subtract/offset some amount of the baseline capacitance that is known to be present in an absolute capacitive measurement. In absolute capacitive sensing, such charge offsetting improves the dynamic range of an amplifier of the ASIC/processing system that is used to amplify a signal which includes an input object related component on top of the baseline absolute capacitance signal measurement. This is because the component of the signal attributed to presence of an input object can be more greatly amplified (without amplifier saturation) if some of the baseline portion is removed by internal offsetting.

Many techniques for internal offset (internal to the ASIC/processing system) of a baseline charge are known in the art and include utilizing an offsetting capacitance in parallel with a feedback capacitor of the amplifier and/or injecting charge to an input of the amplifier that is also coupled with the sensor from which an absolute capacitance is being measured.

In some embodiments, using techniques herein, one or more portions of a printed circuit (e.g., a flexible printed circuit, a printed circuit board, a lithographically printed circuit, or other type of printed circuit) that includes routing traces used to couple sensing signals to and/or from sensors in a sensing region of a sensing device can be used to offset some amount of the baseline capacitance measured during absolute capacitive sensing. This type of charge offsetting is accomplished external to the ASIC/processing system. It should be appreciated that any of the external charge offsetting techniques described herein may be utilized alone or may be used in combination with one or more internal charge offsetting techniques.

As will be described further herein, various techniques can be used to determine a plurality of substantially orthogonal noise templates for use with a set of sensor electrodes that acquire changes of capacitance. Display noise coupled into an acquired plurality of changes of capacitance (e.g., acquired resulting signals) can be subtracted out via the use of two or more of these substantially orthogonal noise templates that are successively and independently fitted to and subtracted from measured changes of capacitance. Once the measured changes of capacitance have been modified by use of two or more substantially orthogonal templates, the modified changes of capacitance can be analyzed to determine the presence of an input object in a capacitive sensing region associated with the sensor electrodes which were used to acquire the plurality of changes in capacitance.

Example Processing System

Figure 3:
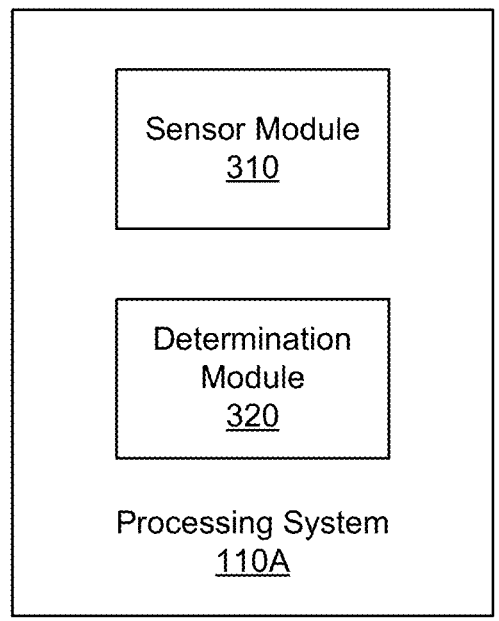
FIG. 3 illustrates a block diagram of some components of an example processing system that may be utilized with an input device, according to various embodiments.

FIG. 3 illustrates a block diagram of some components of an example processing system 110A that may be utilized with an input device (e.g., in place of processing system 110 as part of input device 100), according to various embodiments. As described herein, input device 110 is a capacitive sensing input device, in various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes, among other components: sensor module 310, and determination module 320. Processing system 110A and/or components thereof may be coupled with sensor electrodes of a sensor electrode pattern, such as sensor electrode pattern 200, among others. For example, sensor module 310 has a plurality of input/output channels coupled with one or more sensor electrodes (260, 270) of a sensor electrode pattern (e.g., sensor electrode pattern 200) of input device 100.

In various embodiments, sensor module 310 comprises sensor circuitry and operates to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing.

Sensor module 310 is a hardware portion of processing system 100A and is configured, in some embodiments, to acquire transcapacitive resulting signals by transmitting with a first one of a plurality of sensor electrodes of the input device and receiving with a second one of the plurality of sensor electrodes. During transcapacitive sensing, sensor module 310 operates to drive (i.e., transmit) transmitter signals on one or more sensor electrodes of a first plurality of sensor electrodes (e.g., one or more of transmitter electrodes 260). A transmitter signal may be a square wave, trapezoidal wave, or some other waveform. In a given time interval, sensor module 310 may drive or not drive a transmitter signal (waveform) on one or more of the plurality of sensor electrodes. Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more transmitter electrodes of a sensor electrode pattern at one time. When driving two or more sensor electrodes of a sensor electrode pattern at once, the transmitter signals may be coded according to a code. The code may be altered, such as lengthening or shortening the code. Sensor module 310 also operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. It is appreciated that sensor module 310 may, in a similar fashion, transmit transmitter signals on one or more of sensor electrodes 270 and receive corresponding resulting signals on one or more of sensor electrodes 260.

In absolute capacitive sensing, a sensor electrode is both driven and used to receive a resulting signal that results from the signal driven on to the sensor electrode. In this manner, during absolute capacitive sensing, sensor module 310 operates to drive (i.e., transmit) a signal on to and receive a signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In various embodiments, sensor module 310 includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. Sensor module 310 may include other analog components such as capacitors and/or resistors. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensor module 310 may include multiple amplifiers utilized in any of these manners. For example, in some embodiments, a first amplifier may be coupled with a first sensor electrode while a second amplifier is coupled with a second sensor electrode.

Determination module 320 is a portion of processing system 110A and may be implemented as hardware (e.g., hardware logic and/or other circuitry) and/or as a combination of hardware and instructions stored in a non-transitory manner in a computer readable storage medium.

Determination module 320 operates to compute/determine a measurement of a change in a transcapacitive coupling between a first and second sensor electrode during transcapacitive sensing. Determination module 320 then uses such measurements to determine the positional information comprising the position of an input object (if any) with respect to sensing region 120. The positional information can be determined from a transcapacitive image. The transcapacitive image is determined by determination module 320 based upon resulting signals acquired by sensor module 310. The resulting signals are used as or form capacitive pixels representative of input(s) relative to sensing region 120. It is appreciated that determination module 320 operates to decode and reassemble coded resulting signals to construct a transcapacitive image from a transcapacitive scan of a plurality of sensor electrodes.

In embodiments where absolute capacitive sensing is performed with sensor electrodes 260 and/or 270, determination module 320 also operates to compute/determine a measurement of absolute capacitive coupling to a sensor electrode. For example, determination module 320 operates to determine an absolute capacitance of the sensor electrode (e.g., sensor electrode 270-1) after a sensing signal has been driven on the sensor electrode. It should be noted that processing system 110A may, in some embodiments, compute an absolute capacitive image by combining (e.g., through multiplication, addition, or other means) absolute capacitive profiles measured along at least two different axes of a sensing region. In some embodiments, the sensor electrodes may be configured in a matrix array allowing the processing system 110A to capture a plurality of absolute capacitance signals in the sensing region and compute an absolute capacitive image without the use of intermediate capacitive profiles. With reference to FIG. 2 as an example, in some embodiments, determination module 320 creates an absolute capacitive image by combining a first absolute capacitive profile acquired with sensor electrodes 260 with a second absolute capacitive profile acquired with sensor electrodes 270. Determination module 320 then uses such measurements to determine the positional information comprising the position of an input object (if any) with respect to sensing region 120. The positional information can be determined from, for example, an absolute capacitive image or from absolute capacitive profiles.

In some embodiments determination module 320 may utilize measurements (i.e., resulting signals) obtained from both absolute capacitive sensing and transcapacitive sensing (instead of using measurements from just one type of these types capacitive sensing) in determining a position of an input object relative to sensing region 120. This is sometimes referred to as hybrid capacitive sensing. Determination module 320 then uses such measurements to determine the positional information comprising the position of an input object (if any) with respect to sensing region 120. The positional information can be determined from a hybrid capacitive image.

As will be described in greater detail below, processing system 110A may operate, in various embodiments, to, alone or in cooperation, determine a plurality of substantially orthogonal noise templates for use in reducing noise components in acquired changes of capacitance (e.g., resulting signals) during capacitive sensing. In embodiments where processing system 110 operates "in cooperation" to determine the plurality of substantially orthogonal noise templates, processing system 110A acquires bursts of raw changes of capacitance from capacitive sensors (e.g., receiver electrodes 270) that another processor or computer system utilizes when determining each of a plurality of substantially orthogonal noise templates. Processing system 110A or the other processor/computer system then selects multiple substantially orthogonal noise templates from the plurality of substantially orthogonal noise templates, to be used as a set of substantially orthogonal noise templates for reduction of the noise components of the acquired plurality of changes of capacitance. The selection may be of a predetermined fixed number, such as 2, 3, 4, 5, or more of the plurality of substantially orthogonal noise templates based on highest Eigenvalues. The selection may be based on one or more criteria, such as selecting at least of the plurality of substantially orthogonal noise templates and continuing to select additional templates until the Eigenvalue associated with the next substantially orthogonal noise template evaluated for selection is less than an order of magnitude lower than the Eigenvalue associated with the last selected substantially orthogonal noise template. Other criteria and conditions are possible and anticipated.

As will be described in greater detail below, processing system 110A may operate, to modify acquired changes of capacitance (e.g., resulting signals) utilizing, successively and independently, each of a plurality of substantially orthogonal noise templates which have been selected from a set of available noise templates. The set of substantially orthogonal noise templates may have been predetermined or provided and the stored in a memory internal to or accessible by processing system 110A. Once two or more of set of substantially orthogonal noise templates have been used to modify the acquired changes of capacitance, processing system 110A (e.g., determination module 320) may then utilize the modified changes of capacitance to determine the presence of and/or a position of an input object relative to sensing region 120. This determining is done in the manner previously described with respect to the resulting signals (e.g., from absolute capacitive sensing, transcapacitive sensing, or some combination thereof).

In some embodiments, processing system 110A comprises decision making logic which directs one or more portions of processing system 110A, such as sensor module 310 and/or determination module 320, to operate in a selected one of a plurality of different operating modes based on various inputs.

Example of Display Noise Subtraction Via Multiple Orthogonal Noise Templates

Figure 4A:
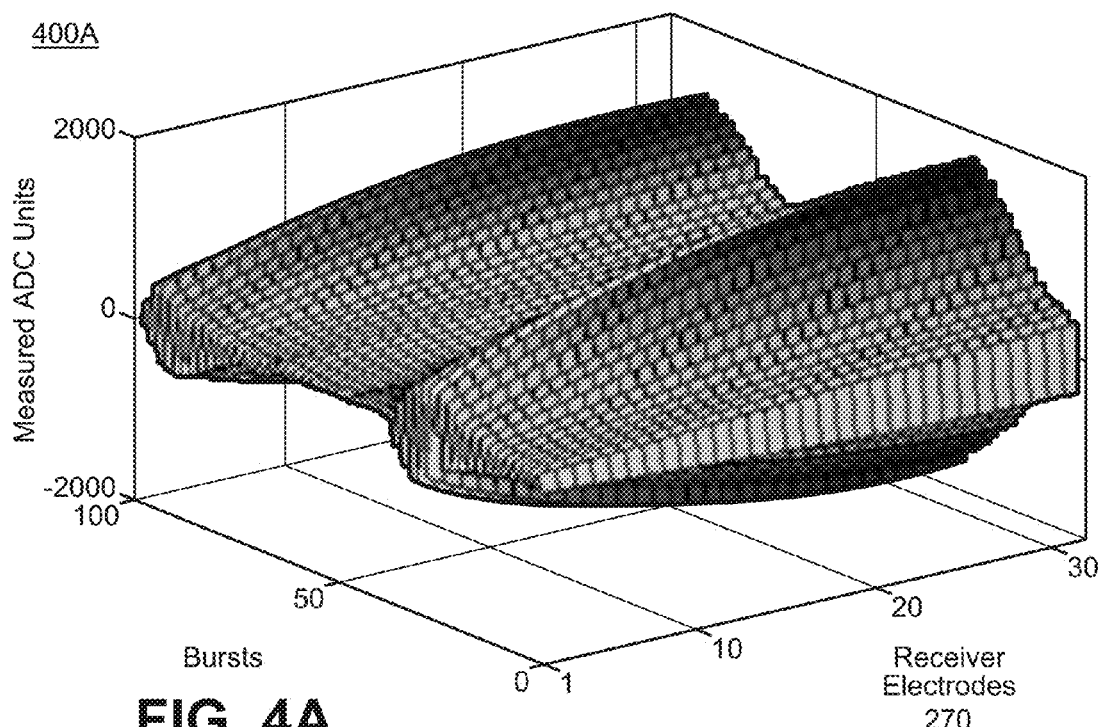
FIG. 4A illustrates a graph of a plurality of raw changes of capacitance, which include noise components, that have been acquired from a plurality of sensor electrodes in a sensing region of a capacitive sensor, according to various embodiments.

FIG. 4A illustrates a graph 400A of a plurality of raw changes of capacitance, which include noise components, that have been acquired from a plurality of sensor electrodes in a sensing region of a capacitive sensor, according to various embodiments. In this example, these raw values were captured when no input object was present or interacting with the sensing region of the sensor electrodes. Thus the results shown are purely display noise and other noise. The x-axis represents the 32 sensor electrodes (e.g., receiver electrodes 270-1 through 270-32 in this case) of a sensor electrode pattern (e.g., 200) of a capacitive sensor which were used to receive the raw changes of capacitance. The y-axis represents the number of bursts, 100 in this example, over which the changes in capacitance were collected. A greater or lesser number of bursts can be used, and the bursts may all be collected from the same set of sensors or from a two or more sets of sensors of the same type (e.g., from two or more sensor electrode patterns of separate electronic devices 150 with common configurations of touch/proximity sensing and display hardware). The z-axis represents the units or magnitude of the measurements of raw capacitance, which runs from +2000 to −2000 analog-to-digital converter (ADC) units. Here, the units are also raw measured ADC units that have not yet being converted into voltages, capacitances, or other units. Nevertheless, the magnitudes bear a proportional relationship to the magnitudes of changes of capacitances. Of particular note these raw measurements of changes in capacitance include noise, such as display coupled noise, and the z-axis has a peak-to-peak scale of approximately 4000 ADC units.

Figure 4B:
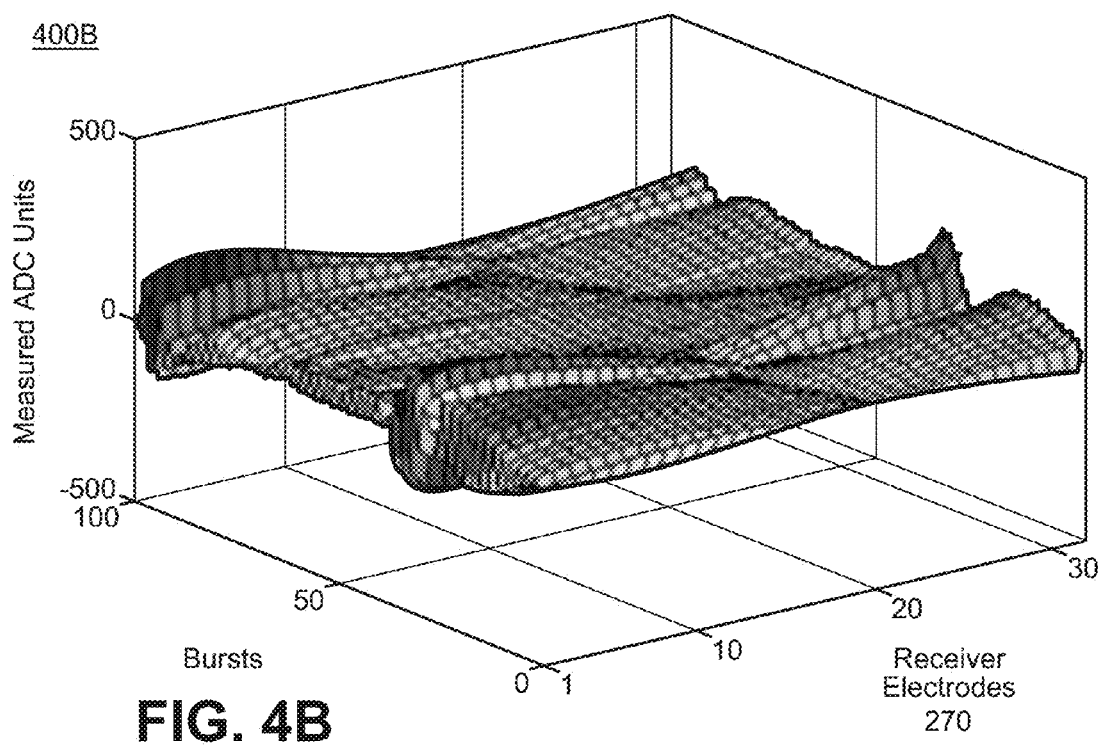
FIG. 4B illustrates a graph of the once corrected changes of capacitance after modifying the plurality of plurality of raw changes of capacitance of FIG. 4A utilizing a first substantially orthogonal noise template, according to various embodiments.
Figure 4C:
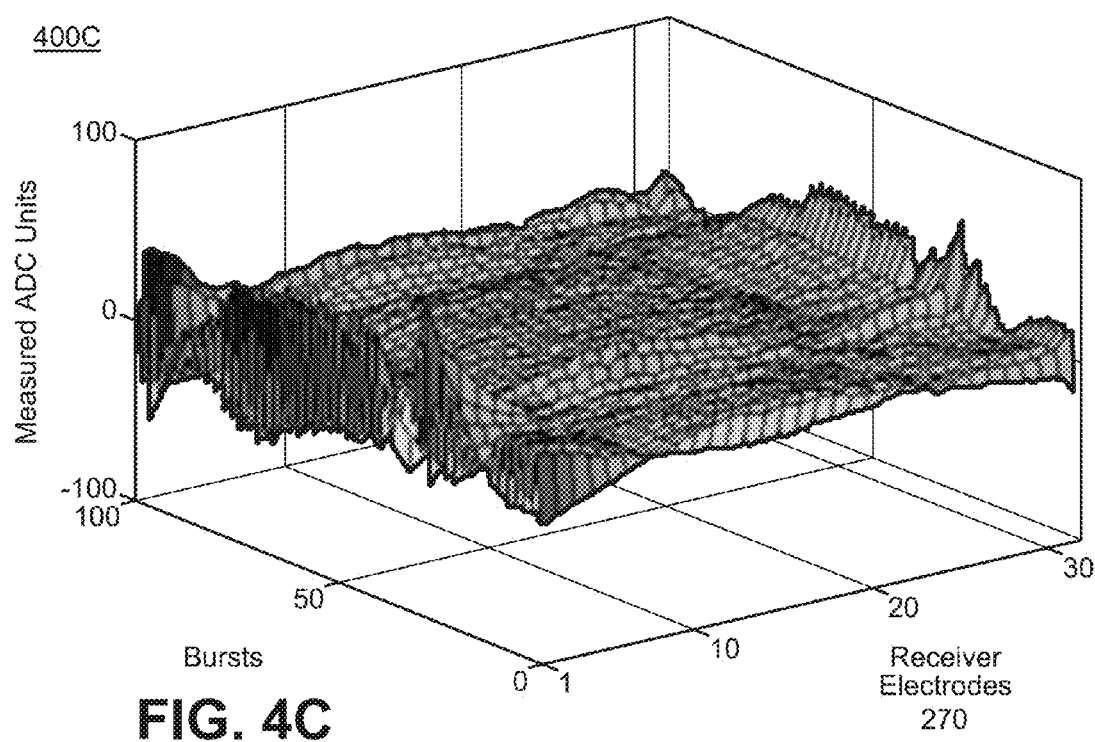
FIG. 4C illustrates a graph of the twice corrected changes of capacitance after modifying the once corrected changes of capacitance of FIG. 4B utilizing, successively and independently, a second substantially orthogonal noise template, according to various embodiments.
Figure 4D:
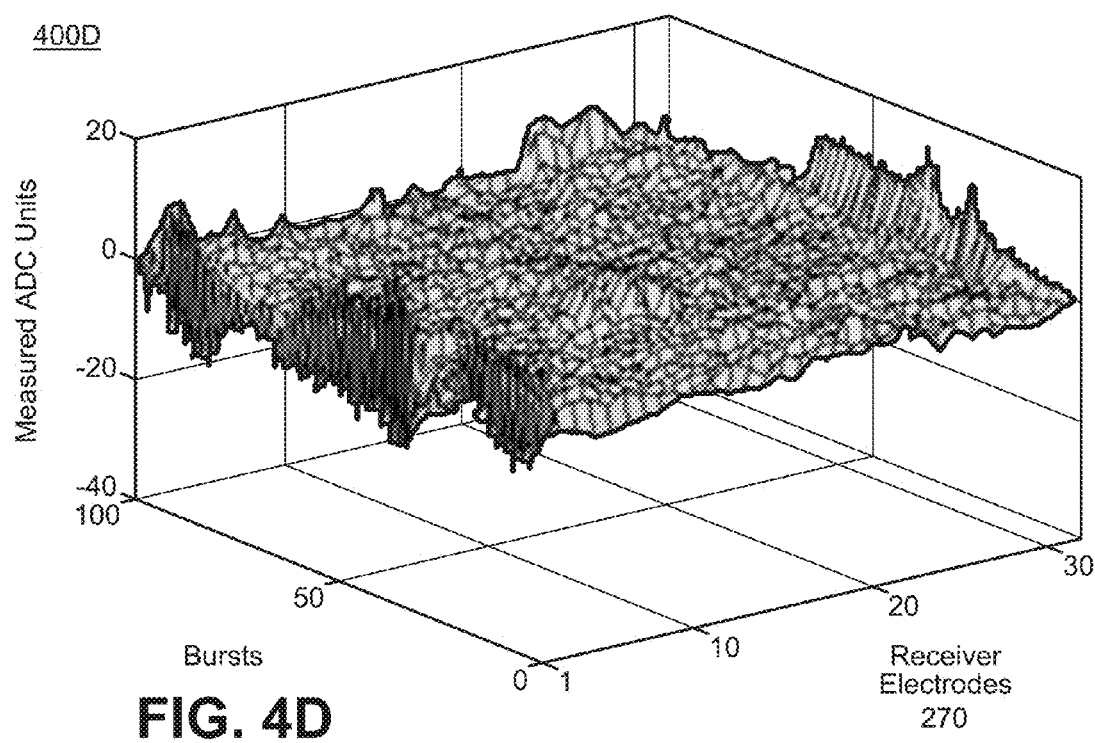
FIG. 4D illustrates a graph of the thrice corrected changes of capacitance after modifying the twice corrected changes of capacitance of FIG. 4C utilizing, successively and independently, a third substantially orthogonal noise template, according to various embodiments.
Figure 6:
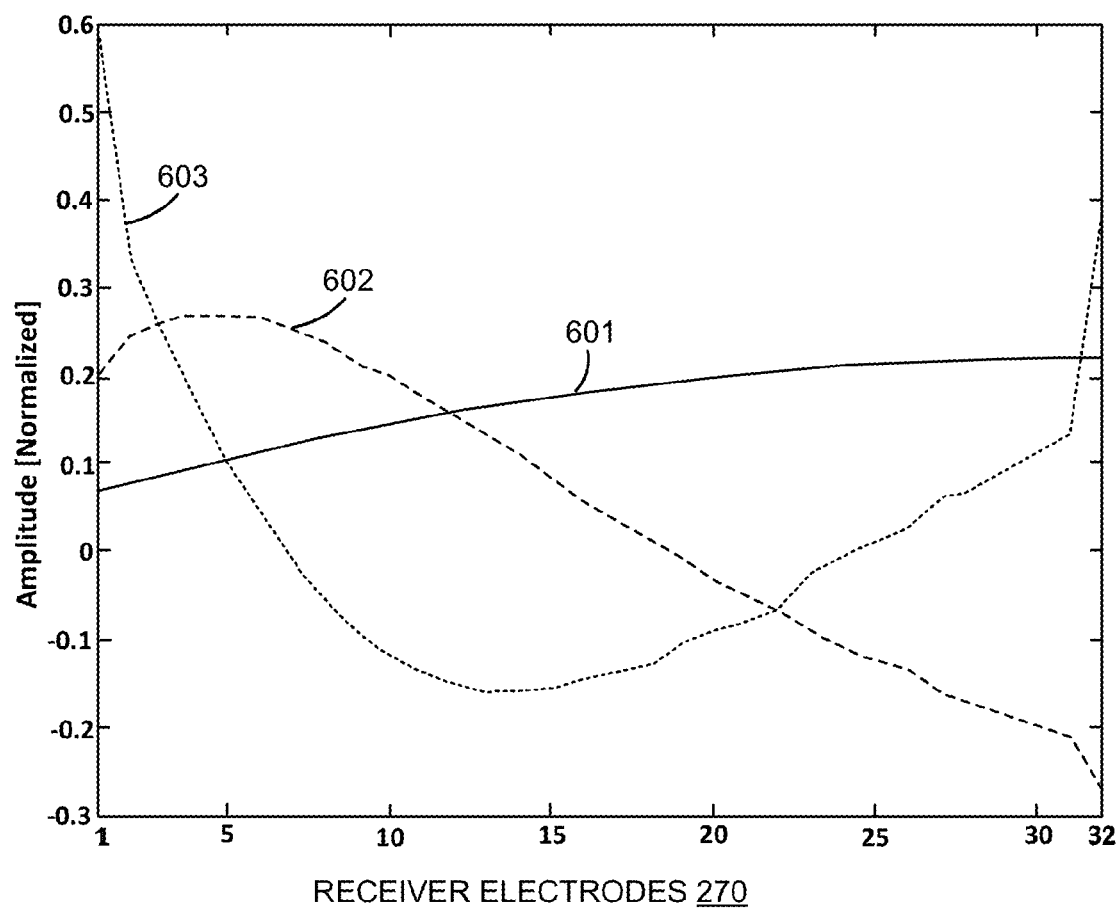
FIG. 6 illustrates a graph of the Eigenvectors associated with three of the Eigenvalues of FIG. 5 and which were utilized as the first, second, and third substantially orthogonal noise templates applied in FIGS. 4B, 4C, and 4D, according to various embodiments.
Figures 7, 8:
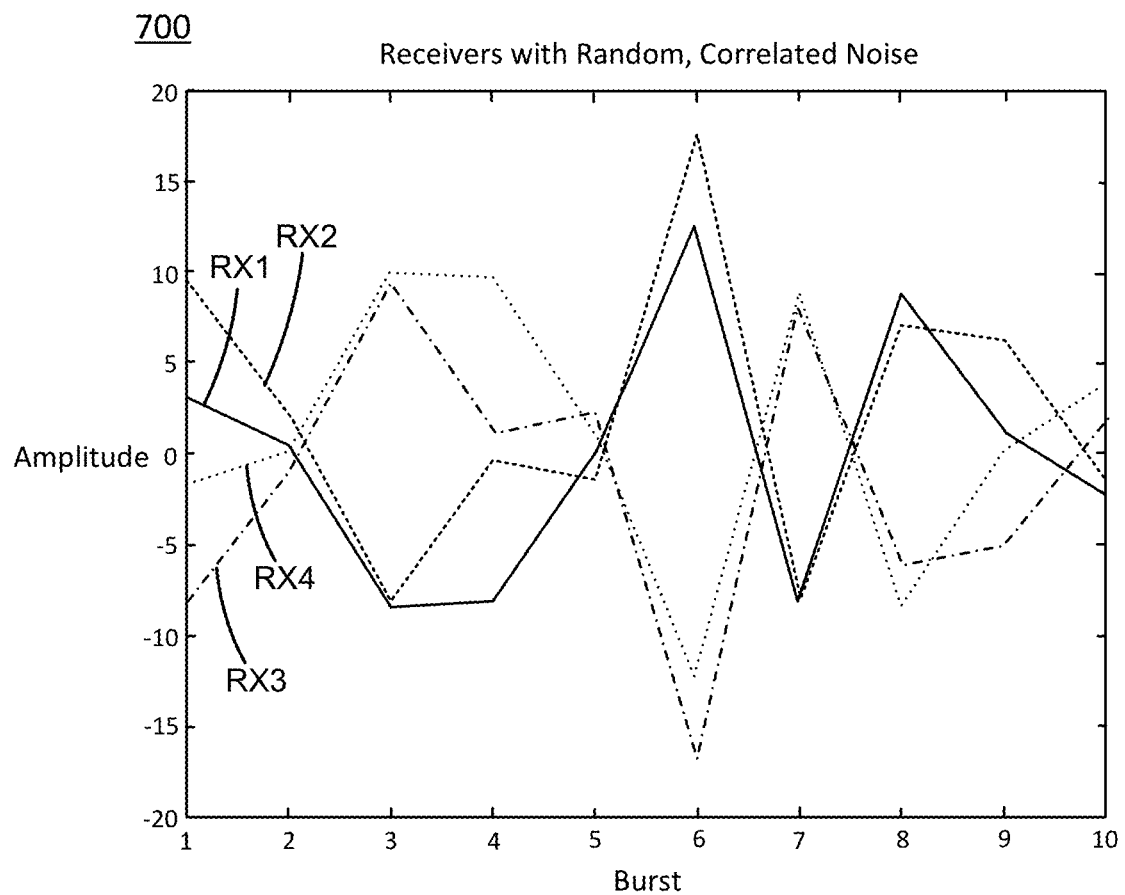
FIG. 7 illustrates a graph of a plurality of raw changes of capacitance, which include noise components, that have been acquired from four sensor electrodes in a sensing region of a capacitive sensor over the course of ten bursts, according to various embodiments.
FIG. 8 illustrates a correlation matrix for the raw changes of capacitance illustrated in FIG. 7, according to various embodiments.

Conventionally, a single noise template would be fitted to this raw data and then subtracted, typically resulting in a 10 dB to 20 dB noise reduction. However, using techniques described herein, multiple orthogonal noise templates are determined and then two or more (instead of the single one in the conventional approach) are successively and independently fitted. This process is capable of 40 dB to 50 dB of display noise reduction. Using several substantially orthogonal noise templates allows for fitting additional variables into the problem of display noise subtraction which helps to account for: differences in the coupling between sensor electrodes and display electronics when different images are displayed; nonlinearity in the coupling between sensor electrodes and display electronics when strong display noise is present; and time-variations in the coupling between sensor electrodes and display electronics due to temperature variation or gain variation. FIGS. 4B, 4C, and 4D show the result of independent and successive fitting and subtracting of three orthogonal noise templates (601, 602, and 603). FIGS. 6 and 7 will discuss the techniques for determining multiple orthogonal noise templates from which the three orthogonal noise templates applied in FIGS. 4B, 4C, and 4D have been selected.

FIG. 4B illustrates a graph 400B of the once corrected changes of capacitance after modifying the plurality of plurality of raw changes of capacitance of FIG. 4A utilizing, independently, a first substantially orthogonal noise template 601, according to various embodiments. After fitting and subtraction of the first substantially orthogonal noise template 601, the scale of the z-axis has been reduced such that all data can be graphed between +500 and −500 ADC peak-to-peak units of variation.

FIG. 4C illustrates a graph 400C of the twice corrected changes of capacitance after modifying the once corrected changes of capacitance of FIG. 4B utilizing, successively and independently, a second substantially orthogonal noise template 602, according to various embodiments. After fitting and subtraction of the second substantially orthogonal noise template 602, the scale of the z-axis has been reduced such that all data can be graphed between +100 and −100 ADC peak-to-peak units of variation.

FIG. 4D illustrates a graph 400D of the thrice corrected changes of capacitance after modifying the twice corrected changes of capacitance of FIG. 4C utilizing, successively and independently, a third substantially orthogonal noise template 603, according to various embodiments. After fitting and subtraction of the third substantially orthogonal noise template 603, the scale of the z-axis has been reduced such that all data can be graphed between +20 and −40 ADC peak-to-peak units of variation, and generally residuals have fallen to less than 10 peak-to-peak ADC units from most sensor electrodes 270.

It should be appreciated that if additional orthogonal or substantially orthogonal noise templates are available, one or more of them can be independently and successively fitted to and subtracted from the thrice corrected changes of capacitance illustrated in graph 400D. However, there is a diminishing benefit and the possibility of overfit at some point as additional noise templates are applied. The diminished benefit is something that can be weighed against the use of computational resources when selecting or determining the number of orthogonal or substantially orthogonal noise templates that are fit and subtracted. In some embodiments, after taking these factors into account, this number will be between 2 and 5, in others it may be more. The number is limited on the upper end by the number of orthogonal or substantially orthogonal noise templates that are available. Generally, the upper limit to the number of orthogonal or substantially orthogonal noise templates that can be determined is bounded by the number of sensor electrodes that are used to receive the changes in capacitances; in the examples of FIGS. 4A-4D this number is 32.

The choice of orthogonal or substantially orthogonal noise templates is not trivial. One approach is to capture many frames (e.g., the bursts illustrated in FIG. 4A) of display-noise affected data and perform a principal component analysis (PCA) on the data. It should be appreciated that other techniques for statistical analysis and other techniques which facilitate orthogonal linear transformation may be employed. PCA is a well-known linear algebra technique which, when applied to multi-dimensional random variable sets, allows for identification of the most signification Eigenvectors of the system, where the significance is measured by the Eigenvalues that correspond to the Eigenvectors. In essence, the PCA reveals those basis vectors in the multi-dimensional space along which most of the random variability lies.

In the case of display coupled noise, the random variables are the measurements from the individual sensor electrodes (e.g., sensor electrodes 270 in FIG. 4A). Applying PCA to many frames of display noise data reveals a set of orthogonal noise templates, which can be ordered by significance based on their Eigenvalues (where higher Eigenvalue indicates greater significance). In the example illustrated in FIGS. 4B-4D, the most significant three of these orthogonal noise templates were selected and then fitted to and subtracted from the data illustrated in FIG. 4A. This allows for a much closer fit and a greater reduction in display noise than had a single noise template been applied.

Figure 5:
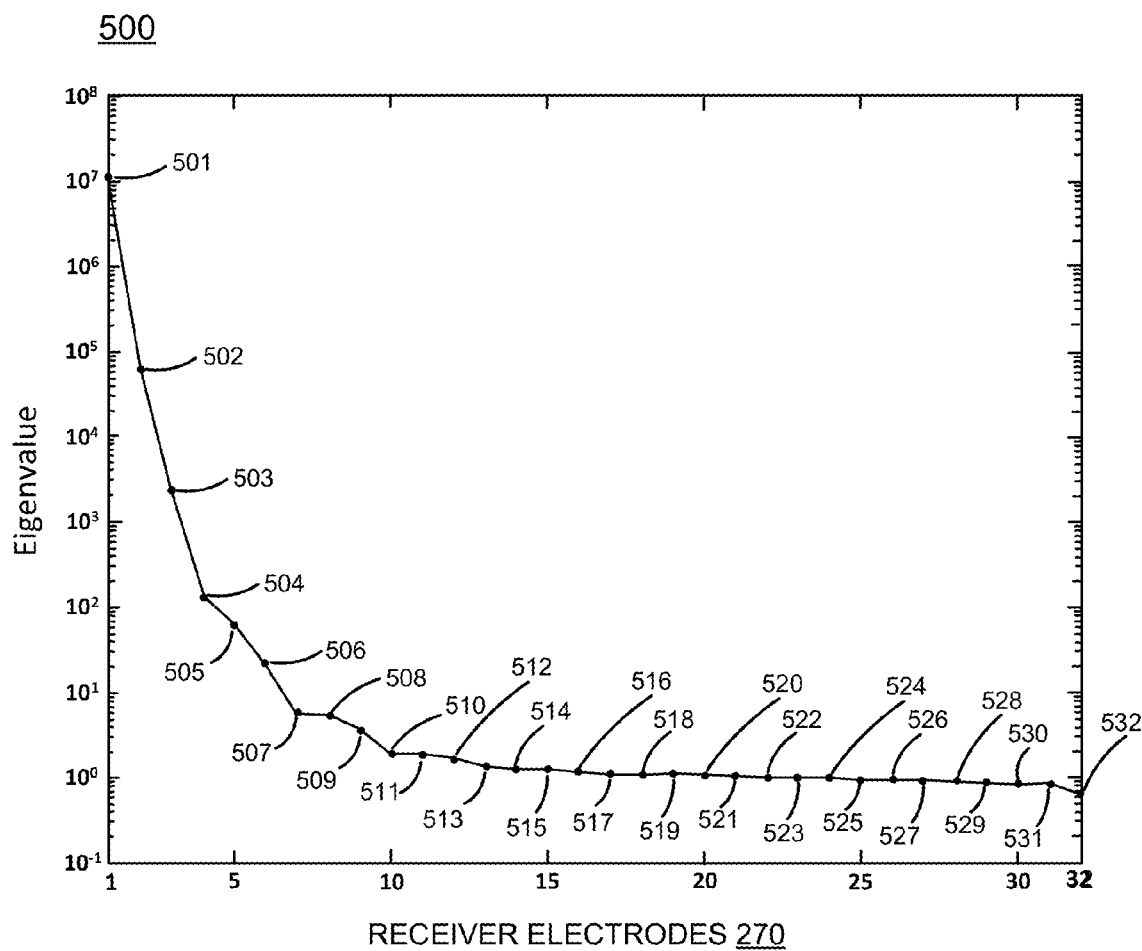
FIG. 5 illustrates a graph of the Eigenvalues associated with a plurality of Eigenvectors from which the first, second, and third substantially orthogonal noise templates applied in FIGS. 4B, 4C, and 4D were selected, according to various embodiments.

FIG. 5 illustrates a graph 500 of the Eigenvalues (501-532) associated with a plurality of Eigenvectors (32 total) from which the first 601, second 602, and third 603 substantially orthogonal noise templates applied in FIGS. 4B, 4C, and 4D were selected, according to various embodiments. Of note, the y-axis of the graph of is logarithmic, and thus there is a substantial drop-off of over an order of magnitude between Eigenvalues 501 and 502, whereas the drop-off between Eigenvalues 507 and 508 is within the same order of magnitude and is thus much less substantial. Eigenvalues 501-532 are rank ordered from largest to smallest from left to right in graph 500, and it is clear that they decrease rapidly in value and that the majority of significance can be captured by using the Eigenvectors associated with the first several Eigenvalues (e.g. 501 and 502 up to perhaps 501-507). In the example of FIGS. 4A-4D, Eigenvectors 601-603, which are associated with Eigenvalues 501-503, respectively, were selected for use.

FIG. 6 illustrates a graph 600 of the Eigenvectors (601, 602, and 603) associated with three of the Eigenvalues (501, 502, and 503 respectively) of FIG. 5 and which were utilized as the first, second, and third substantially orthogonal noise templates applied in FIGS. 4B, 4C, and 4D, according to various embodiments. For example, substantially orthogonal noise template 601 was fitted to the data of graph 400A by determining amplitude modifier(s) which would give it the proper amplitude to fit the data, then multiplying the substantially orthogonal noise template 601 by this amplitude modifier, and then subtracting the amplitude modified substantially orthogonal noise template 601 from the data of graph 400A to achieve graph 400B shown in FIG. 4B. In the same fashion, substantially orthogonal noise template 602 was amplitude fitted to the data of graph 400B and then subtracted to achieve the data of graph 400C. In the same fashion, substantially orthogonal noise template 603 was amplitude fitted to the data of graph 400C and then subtracted to achieve the data of graph 400D. Various techniques may be used to accomplish the fitting. One example involves employing non-linear regression technique (such as successive approximation) to accomplish the fitting. Another example involves employing a linear regression technique (such as linear least-squares) to accomplish the fitting.

Although the Eigenvectors illustrated in FIG. 6 are actually orthogonal with one and other and, based at least on the depictions of the Eigenvectors, it should be apparent to one of skill in the art that they could be closely and substantially replicated by substituting common waveforms for the calculated waveforms illustrated in graph 600. For example, a quarter sinewave can be substituted for orthogonal noise template 601, a half sinewave can be substituted for orthogonal noise template 602, and a 90 degree phase shifted (from 602) half sinewave can be substituted for orthogonal noise template 603. Such substituted waveforms can be utilized in some embodiments, and would have most of the display noise reduction efficacy of the Eigenvectors illustrated in graph 600.

It is noted that once a set of substantially orthogonal noise templates for a particular sensor electrode/display configuration (e.g., for a particular hardware configuration of an electronic system 150 such as a phone, tablet computer, or other touchscreen device) the same substantially orthogonal noise templates can be stored and used with other like items. Thus, the substantially orthogonal noise templates can be determined in advance, such as in a laboratory or factory setting, from data collected from a single or multiple copies of an electronic system 150 with a particular sensor electrode/display configuration and then utilized in others of examples of the electronic system 150 that share the same configuration. As discussed above, orthogonal functions (e.g., sinewaves, cosine waves, or the like) can be substituted.

An extension of this concept of waveform substitution, which could be done without empirical testing, is to simply utilize a plurality of low order orthogonal functions such a set of sinewaves at various frequencies and phases which are orthogonal. For example, such a set could include a 0 frequency sinewave, a ¼ sinewave, a ½ sinewave, and a ½ sinewave shifted by 90 degrees from the other ½ sinewave cohort. Obviously other combinations of low order orthogonal functions and/or substantially orthogonal functions are possible. Successively and independently employing two or more of these non-empirically determined orthogonal and/or substantially orthogonal noise templates would, in most if not all instances, produce greater noise reduction than the current state of the art of using a single noise template to subtract noise.

Herein, noise templates are orthogonal when they can be multiplied together and then when adding up all their products, they sum to zero. Mathematically this means that, when used independently, these orthogonal noise templates will not interfere with each other, and thus it is unnecessary to have, or to expend, the computational resources to fit them all at once to a set of data. Rather, limited computational power can be used fit them successively, one at a time. In general the term "substantially orthogonal" is used herein to encompass noise templates that are perfectly orthogonal, and to also encompass noise templates that are almost orthogonal with one another. That is, in some embodiments, being "substantially orthogonal" is defined as the scalar product of two noise templates being small in absolute value. For example, noise templates are considered substantially orthogonal with one another if the scalar product of two noise templates has an absolute value of less than: 5% of the peak-to-peak amplitudes in some embodiments, 3% of peak-to-peak amplitudes in some embodiments; 1% peak-to-peak amplitude in some embodiments.

Some small variation is tenable, because being almost orthogonal will give most of the benefits of being perfectly orthogonal. As an example, a first noise template will be orthogonal with a second noise template if they represent the same waveform but one is phase-shifted by 90 degrees with respect to the other. The same two noise templates may be considered substantially orthogonal if this phase shift is not quite 90 degrees, such as 89 degrees or 85 degrees. As a second example, a first noise template will be orthogonal with a second noise template if they represent the same wave form but one has a period that is twice the period of the other. The same two noise templates may be considered substantially orthogonal if the difference in frequency is not quite a multiple of 2, such as: 1.99, 1.95 or 1.90, in various embodiments. There may be a combination of these variations in phase shift and frequency in templates that are considered substantially orthogonal with respect to one another.

Example of Determining and Fitting Orthogonal Noise Templates

FIGS. 7-12 illustrates a simplified example, using four receiving sensor electrodes 270, for determining and fitting orthogonal noise templates. This example shows a PCA analysis for four receiver electrodes over ten bursts of data. The sensor electrodes have correlated noise according to two orthogonal vectors which are [1 1 −1 −1] and [1 −1 −1 1]. The former correlation is 3.3× stronger than the latter one.

FIG. 7 illustrates a graph 700 of a plurality of raw changes of capacitance, which include noise components, that have been acquired from four sensor electrodes in a sensing region of a capacitive sensor over the course of ten bursts, according to various embodiments. For example, graphed data RX1 is associated with a first receiving sensor electrode 270-1; graphed data RX2 is associated with a first receiving sensor electrode 270-2; graphed data RX3 is associated with a first receiving sensor electrode 270-3; and graphed data RX4 is associated with a first receiving sensor electrode 270-4.

FIG. 8 illustrates a correlation matrix 800 for the raw changes of capacitance illustrated in FIG. 7, according to various embodiments. The Eigenvectors of correlation matrix 800 are used as the orthogonal noise templates. The two most significant ones are shown in FIG. 10.

Figure 9:
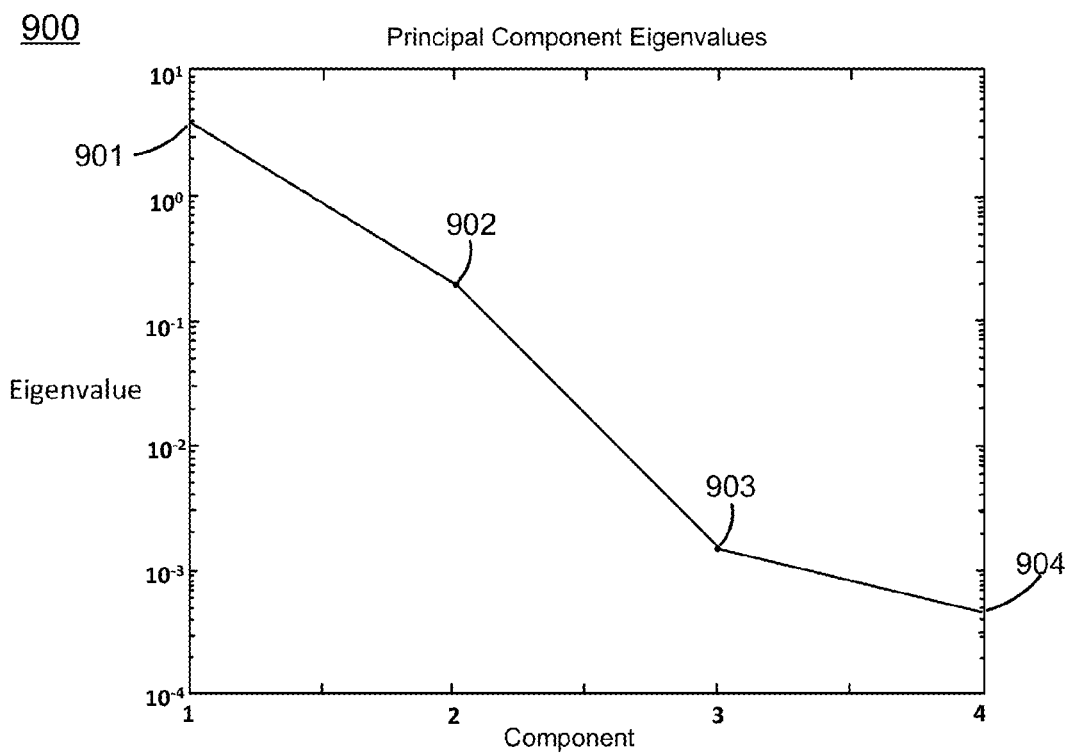
FIG. 9 illustrates a graph of the Eigenvalues associated with a plurality of Eigenvectors calculated from the correlation matrix of FIG. 8, according to various embodiments.

FIG. 9 illustrates a graph 900 of the Eigenvalues (901, 902, 903, and 904) associated with a plurality of Eigenvectors calculated from the correlation matrix of FIG. 8, according to various embodiments. The two most significant Eigenvalues are 901 and 902, and their respective Eigenvectors 1001 and 1002 are shown in FIG. 10.

Figure 10:
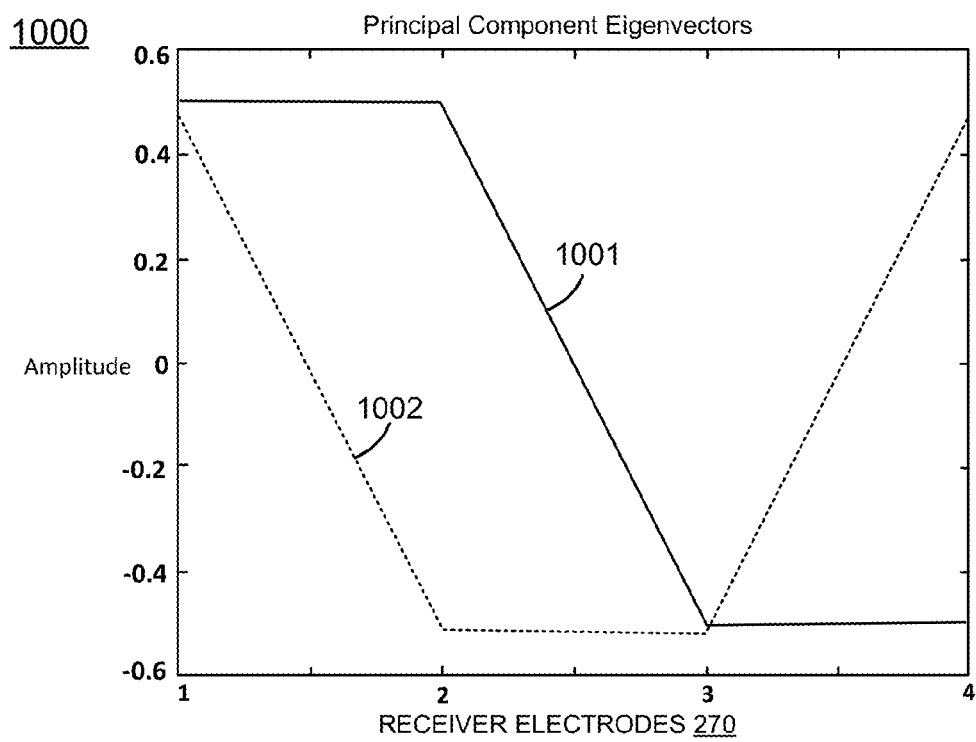
FIG. 10 illustrates a graph of the Eigenvectors associated with two of the Eigenvalues of FIG. 9, according to various embodiments.

FIG. 10 illustrates a graph 1000 of the Eigenvectors (1001 and 1002) associated with two of the Eigenvalues (901 and 902 respectively) of FIG. 9, according to various embodiments.

Figure 11:
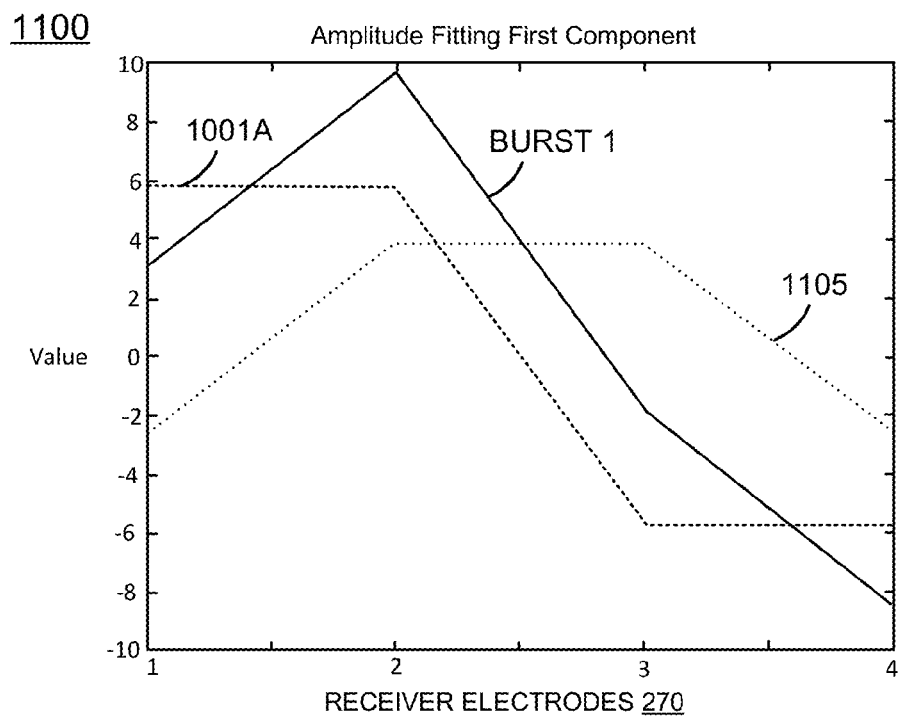
FIG. 11 illustrates a graph showing the raw data from burst one of FIG. 7, with the linear best-fit from a first Eigenvector of FIG. 10, and the residual when the fitted eigenvector is subtracted, according to an embodiment.

FIG. 11 illustrates a graph 1100 showing the raw data from burst one of FIG. 7, with the linear best-fit 1001A from a first Eigenvector 1001 of FIG. 10, and the residual 1105 when the fitted eigenvector 1001A is subtracted, according to an embodiment. The data labeled as "Burst 1" is a summation of the raw data from all receiver electrodes (RX1, RX2, RX3, and RX4) during burst number one. In this example, the fitting was done through linear regression techniques. Other fitting techniques may be employed, such as non-linear regression may be employed.

Figure 12:
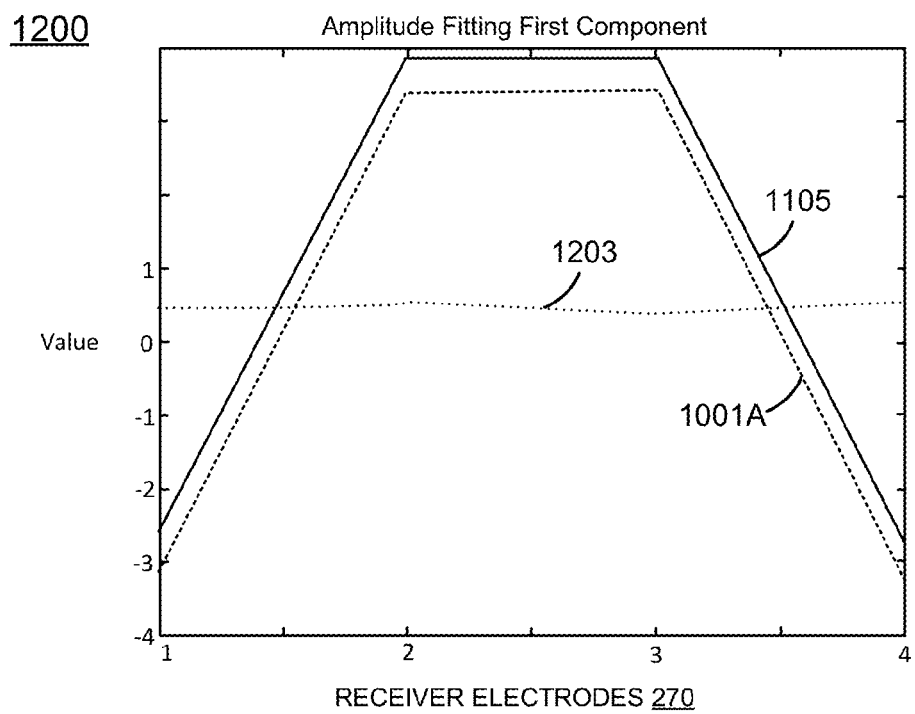
FIG. 12 illustrates a graph showing the linear best-fit from a second Eigenvector of FIG. 10, the residual from FIG. 11, and the second residual once the second Eigenvector is subtracted from the first residual, according to an embodiment.

FIG. 12 illustrates a graph 1200 showing the linear best-fit 1002A from a second Eigenvector 1002 of FIG. 10, the residual 1105 from FIG. 11, and the second residual once the second Eigenvector is subtracted from the first residual, according to an embodiment. The second residual includes a small DC offset which is a residual from the extremely small number of data bursts utilized in this example.

Example Methods of Determining Noise Templates for Use in Capacitive Sensing FIGS. 13A, 13B and 13C illustrate a flow diagram 1300 of a method of determining noise templates for use in capacitive sensing, according to various embodiments. Procedures of this method will be described with reference to elements and/or components of one or more of FIGS. 1-12. It is appreciated that in some embodiments, the procedures may be performed in a different order than described, that some of the described procedures may not be performed, and/or that one or more additional procedures to those described may be performed.

With reference to FIG. 13A, at procedure 1310 of flow diagram 1300, in various embodiments, a plurality of changes of capacitance are acquired from a plurality of sensor electrodes in a sample capacitive sensor. The plurality of capacitive changes include noise components, such as display coupled noise components. For example, processing system 100A or other processing system can be used to acquire the plurality of changes of capacitance from sensor electrodes, such as sensor electrodes 270, of a capacitive sensor. The capacitive sensor may be a sample, in that it is representative of other capacitive sensor (e.g., touch/proximity sensors) in a production run and/or of a particular design. Such a sample sensor electrode would typically be tested in configuration with the display with which it will be operated. The acquisition of the plurality of changes of capacitance can comprise acquiring multiple changes of capacitance for each sensor electrode of the plurality of sensor electrodes. For example a single burst (e.g., capacitive sensing frame) may capture capacitive changes for each of the plurality of sensor electrodes, and multiple bursts (10, 100, 1,000 etc.) may be captured for the sensor electrodes of the sample capacitive sensor. One or more bursts of a plurality of changes of capacitance for each of a plurality of sample capacitive sensors of the same type as the sample capacitive sensor may similarly be captured and the captured data from the multiple capacitive sensors of the same time may be combined into a single data set. This allows for compensation of manufacturing irregularities.

With continued reference to FIG. 13A, at procedure 1320 of flow diagram 1300, in one embodiment, each of a plurality of substantially orthogonal noise templates are determined based on the acquired plurality of changes in capacitance. The substantially orthogonal noise templates may be determined by processing system 110A or by another processor, such as the processor of an electronic device or computer system that is locates physically apart from the electronic device in which processing system 110A is disposed. Any suitable technique may be utilized for determining the substantially orthogonal noise templates. In one embodiment, the substantially orthogonal noise templates are determined utilizing principal component analysis to calculate significant eigenvectors and then the plurality of substantially orthogonal noise templates are calculated and based on the significant eigenvectors. Examples of such determination and calculation were discussed in conjunction with FIGS. 4A-12.

With continued reference to FIG. 13A, at procedure 1330 of flow diagram 1300, in one embodiment, multiple substantially orthogonal noise templates are selected from the plurality of substantially orthogonal noise templates, to be used as a set of substantially orthogonal noise templates for reduction of the noise components of the acquired plurality of changes of capacitance. This can comprise selecting two or more (up to all) of the plurality of substantially orthogonal noise templates. Any technique may be used for the selection. For example, in one embodiment, the default may be to use a certain number of the available templates with the highest Eigenvalues (e.g., the top 2, 3, 4, 5, etc.). In another embodiment, the default may be to use a certain percentage of the available templates that have highest Eigenvalues (e.g., the top 5%, 10%, 25%, etc.). In another embodiment, the default may be to select a certain number of the available templates with the highest Eigenvalues (e.g., the top 2, 3, 4, 5, etc.) that a particular processing system 110A can apply to data within a defined time period or number of processing cycles. In general, the number of available templates is limited by the number of variables used in the PCA, where the number of sensor electrodes that receive the capacitive changes sets this number of variables. Thus, the selecting comprises, in various embodiments, selecting an amount of substantially orthogonal noise templates that is greater than or equal to two and less than or equal the number of sensor electrodes in the plurality of sensor electrodes. In some embodiments, where the selection is not automated, empirical testing or user input may be used to guide the selection of the particular ones and total amount of substantially orthogonal noise templates that are selected to be included in the set.

With reference to FIG. 13B, as illustrated in procedure 1340 of flow diagram 1300, in some embodiments, the method as described in 1310-1330 further comprises storing the set of substantially orthogonal noise templates for future use with capacitive sensors of the same type as the sample capacitive sensor. Once selected, the set of substantially orthogonal noise templates is stored, such as in a memory of or accessible by processing system 110A. Similarly, the set substantially orthogonal noise templates can be stored in other electronic devices 150 of like type (e.g., which use a common touch/proximity sensor and display configuration) for access by the processing systems 110A of those other electronic devices.

With continued reference to FIG. 13C, as illustrated in procedure 1350 of flow diagram 1300, in some embodiments, the method as described in 1310-1330 further comprises approximating each substantially orthogonal noise template in the set of substantially orthogonal noise templates with a sinewave to form a set of substantially orthogonal sinewave noise templates. As has been described above, a calculated substantially orthogonal noise template can be approximated by a waveform such as a sinewave. Once the set of substantially orthogonal noise templates has been calculated, one or more of the templates can be approximated with a sinewave, cosine wave, or other waveform. These waveform approximated substantially orthogonal noise templates can then be stored such as in a memory of or accessible by processing system 110A, or in another memory. Similarly, the waveform approximated substantially orthogonal noise templates can be stored in other electronic devices 150 of like type (e.g., which use a common touch/proximity sensor and display configuration) for access by the processing systems 110A of those other electronic devices.

With continued reference to FIG. 13C, at procedure 1360 of flow diagram 1300, in one embodiment, the set of substantially orthogonal sinewave noise templates is stored for future use with a capacitive sensing region of the same type as the sample capacitive sensor. As discussed above, the set of substantially orthogonal sinewave noise templates can be stored in other electronic devices 150 of like type (e.g., which use a common touch/proximity sensor and display configuration) for access by the processing systems 110A of those other electronic devices for the purposes of display noise reduction.

Example Methods of Capacitive Sensing

FIG. 14 illustrates a flow diagram 1400 of a method of capacitive sensing, according to various embodiments. Procedures of this method will be described with reference to elements and/or components of one or more of FIGS. 1-11. It is appreciated that in some embodiments, the procedures may be performed in a different order than described, that some of the described procedures may not be performed, and/or that one or more additional procedures to those described may be performed. In various embodiments, method 1400 is implemented by a processing system, such as processing system 110A, that is a hardware device.

With reference to FIG. 14, at procedure 1410 of flow diagram 1400, in one embodiment, a plurality of changes of capacitance, which include noise components, are acquired from a plurality of sensor electrodes in a sensing region of a capacitive sensor. For example, and with reference to FIGS. 1-3, in some embodiments this comprises processing system 110A (e.g., sensor module 310 or some other portion) interacting with a plurality of sensor electrodes (e.g., sensor electrodes 270 of capacitive sensor 200 and sensing region 120) to receive the plurality of changes in capacitance as a result of capacitive sensing (e.g., absolute capacitive sensing, transcapacitive sensing, hybrid capacitive sensing). The capacitive changes may or may not include the interaction of an input object in the sensing region of the sensor electrodes.

With continued reference to FIG. 14, at procedure 1420 of flow diagram 1400, in one embodiment, the plurality of changes of capacitance are modified utilizing, successively and independently, each of a plurality of substantially orthogonal noise templates which have been selected from a set of available noise templates. For example, in some embodiments this comprises processing system 110A (e.g., determination module 310 or some other portion) accomplishing this modifying in the manner illustrated in the examples of FIGS. 4A-6, FIGS. 7-12, and the method 1300 of FIG. 13. For example, the plurality of substantially orthogonal noise templates which have been selected from a set of available noise templates may include some or all of a set of templates that have been determined in advance and stored in memory for access and use by processing system 110A. The plurality of substantially orthogonal noise templates may include mathematically determined orthogonal noise templates, waveform approximations (e.g., sinewaves, cosine waves) of mathematically determined orthogonal noise templates, low order orthogonal functions selected without any mathematical analysis, or some combination thereof.

In various embodiments, the modifying comprises processing system 110A determining an amplitude modifier for each of the plurality of substantially orthogonal noise templates selected from the set of available noise templates. As discussed herein various techniques of non-linear or linear regression may be utilized to determine the amplitude modifiers. In some embodiments, if there is a priori knowledge of which sensor electrodes are likely to have provided signals from an input object, the amplitude modifiers may be determined after masking out acquired capacitive change signals from these sensor electrodes. In some embodiments, acquired capacitive changes that meet a threshold value associated with detection of an input object are masked out when determining the amplitude modifier (e.g., in the regression analysis) for the each of the plurality of substantially orthogonal noise templates. After the amplitude modifiers are determined, in various embodiments, each of the plurality of substantially orthogonal noise templates is multiplied by its respective amplitude modifier to achieve a plurality of amplitude modified substantially orthogonal noise templates. Processing system 110A accomplishes this multiplication in various embodiments. The amplitude modified substantially orthogonal noise templates are then subtracted from the plurality of changes of capacitance. Processing system 110A accomplishes this subtraction in various embodiments.

In some embodiments, a priori knowledge of which sensor electrodes have provided signals from an input object can be obtained in an iterative fashion by performing procedures 1420 and 1430 once without any masking or knowledge of which sensor electrodes have provided signals from an input object and analyzing the results to determine the presence of an input object and which sensor electrodes have detected it. Then performing procedures 1420 and 1430 a second time, on the same plurality of capacitive changes, but this time masking out information from sensor electrodes that have provided signals from an input object.

As discussed previously, in various embodiments, the modifying comprises processing system 110A modifying each of the plurality of changes of capacitance with a plurality of substantially orthogonal noise templates which have been fit to a sample capacitive sensor of the same type as the capacitive sensor. That is, one or more examples of the type are utilized in advance, such as in a laboratory or a factory, to empirically determine the substantially orthogonal noise templates that make up the plurality of substantially orthogonal noise templates.

As discussed previously, in various embodiments, the modifying comprises processing system 110A modifying each of the plurality of changes of capacitance with a plurality of substantially orthogonal sinewave noise templates. These sinewave templates can be waveform approximations of mathematically determined orthogonal noise templates, low order orthogonal functions selected without any mathematical analysis, or some combination thereof.

As discussed previously, in various embodiments, the modifying comprises processing system 110A modifying each of the plurality of changes of capacitance with a plurality of substantially orthogonal noise templates which describe elements of display noise present in the plurality of changes of capacitance. For example, and with reference to FIGS. 4A-4D, the substantially orthogonal noise templates used to achieve the results illustrated in FIGS. 4B, 4C, and 4D are calculated from and describe elements of display noise present in the plurality of changes of capacitance shown in FIG. 4A.

With continued reference to FIG. 14, at procedure 1430 of flow diagram 1400, in one embodiment, presence of an input object in the sensing region is determined based on the modified acquired plurality of changes of capacitance. In various embodiments, this comprises a processing system, such as processing system 110A (e.g., determination module 320 or other portion thereof determining whether or not an input object (e.g., 140) is present in the sensing region (e.g., sensing region 120). When presence of an input object is affirmatively determined, this can further comprise processing system 110A determining the location of the input object within the sensing region.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

What is claimed is:

1. A method of determining noise templates for use in capacitive sensing, said method comprising:
   acquiring a first plurality of changes of capacitance, which include noise components, from a plurality of sensor electrodes in a sample capacitive sensor;
   determining a plurality of substantially orthogonal noise templates and an ordering for said plurality of substantially orthogonal noise templates based on said first plurality of changes of capacitance,
   wherein each of said plurality of substantially orthogonal noise templates comprises a plurality of amplitude values corresponding to said plurality of sensor electrodes;
   selecting a set of said plurality of substantially orthogonal noise templates based on said ordering;
   acquiring a second plurality of changes of capacitance from said plurality of sensor electrodes; and
   reducing noise in the second plurality of changes of capacitance by utilizing said substantially orthogonal noise templates in the set.

2. The method as recited in claim 1, further comprising:
   storing said set of substantially orthogonal noise templates for future use with capacitive sensors of the same type as said sample capacitive sensor.

3. The method as recited in claim 1, wherein utilizing said substantially orthogonal noise templates in the set comprises:
   approximating each substantially orthogonal noise template in said set of substantially orthogonal noise templates with a sinewave to form a set of substantially orthogonal sinewave noise templates; and
   subtracting said set of substantially orthogonal sinewave noise templates from said second plurality of changes of capacitance.

4. The method as recited in claim 1, wherein acquiring said first plurality of changes of capacitance comprises:
   acquiring multiple changes of capacitance for each sensor electrode of said plurality of sensor electrodes.

5. The method as recited in claim 1, wherein acquiring said first plurality of changes of capacitance comprises:
   acquiring said plurality of changes of capacitance for each of a plurality of sample capacitive sensors of the same type as said sample capacitive sensor.

6. The method as recited in claim 1, wherein determining said plurality of substantially orthogonal noise templates comprises:
   utilizing principal component analysis to calculate significant eigenvectors; and
   calculating said plurality of substantially orthogonal noise templates based on said significant eigenvectors, wherein said ordering corresponds to eigenvalues.

7. The method as recited in claim 1, wherein selecting said set comprises:
   selecting an amount of substantially orthogonal noise templates that is greater than or equal to two and less than or equal the number of sensor electrodes in said plurality of sensor electrodes.

8. A method of capacitive sensing, said method comprising:
   acquiring a plurality of changes of capacitance, which include noise components, from a plurality of sensor electrodes in a sensing region of a capacitive sensor;
   reducing noise in said plurality of changes of capacitance utilizing, successively and independently, a plurality of substantially orthogonal noise templates,
   wherein each of said plurality of substantially orthogonal noise templates comprises a plurality of amplitude values corresponding to said plurality of sensor electrodes; and
   determining presence of an input object in said sensing region based on said plurality of changes of capacitance after reducing noise.

9. The method as recited in claim 8, wherein reducing noise in said plurality of changes of capacitance comprises:
   determining an amplitude modifier for each of said plurality of substantially orthogonal noise templates;
   multiplying each of said plurality of substantially orthogonal noise templates by its respective amplitude modifier to achieve a plurality of amplitude modified substantially orthogonal noise templates; and
   subtracting said amplitude modified substantially orthogonal noise templates from said plurality of changes of capacitance.

10. The method as recited in claim 9, wherein determining the amplitude modifier for each of said plurality of substantially orthogonal noise templates comprises:
    masking out acquired capacitive changes that meet a threshold value associated with detection of an input object when determining said amplitude modifier for said each of said plurality of substantially orthogonal noise templates.

11. The method as recited in claim 8, wherein reducing noise in said plurality of changes of capacitance comprises:
    modifying each of said plurality of changes of capacitance with a plurality of substantially orthogonal noise templates which have been fit to a sample capacitive sensor of the same type as said capacitive sensor.

12. The method as recited in claim 8, wherein utilizing said plurality of substantially orthogonal noise templates comprises:
    approximating each of said plurality of substantially orthogonal noise templates with a sinewave to form a plurality of substantially orthogonal sinewave noise templates; and
    subtracting said plurality of substantially orthogonal sinewave noise templates from said plurality of changes of capacitance.

13. The method as recited in claim 8, wherein said plurality of substantially orthogonal noise templates describe elements of display noise present in said plurality of changes of capacitance.

14. A processing system for a capacitive sensing input device, said processing system comprising:

a sensor module comprising a plurality of input channels, said sensing module configured to:
acquire a plurality of changes of capacitance, which include noise components, from a plurality of sensor electrodes in a sensing region of a capacitive sensor of said capacitive sensing input device; and
a determination module configured to:
reduce noise in said plurality of changes of capacitance utilizing, successively and independently, a plurality of substantially orthogonal noise templates,
wherein each of said plurality of substantially orthogonal noise templates comprises a plurality of amplitude values corresponding to said plurality of sensor electrodes; and
determine presence of an input object in said sensing region based on said plurality of changes of capacitance after reducing noise.

15. The processing system of claim 14, wherein reducing noise in said plurality of changes of capacitance comprises:
determining an amplitude modifier for each of said plurality of substantially orthogonal noise templates;
multiplying each of said plurality of substantially orthogonal noise templates by its respective amplitude modifier to achieve a plurality of amplitude modified substantially orthogonal noise templates; and
subtracting said amplitude modified substantially orthogonal noise templates from said changes of capacitance.

16. The processing system of claim 15, wherein said determination module is further configured to:
mask out acquired plurality of capacitive changes that meet a threshold value associated with detection of an input object prior to said amplitude modifier determination.

17. The processing system of claim 14, wherein reducing noise in said plurality of changes of capacitance comprises:
modifying each of said plurality of changes of capacitance with said plurality of substantially orthogonal noise templates which have been fit to a sample capacitive sensor of the same type as said capacitive sensor.

18. The processing system of claim 14, wherein utilizing said plurality of substantially orthogonal noise templates comprises:
approximating each of said plurality of substantially orthogonal noise templates with a sinewave to form a plurality of substantially orthogonal sinewave noise templates; and
subtracting said plurality of substantially orthogonal sinewave noise templates from said plurality of changes of capacitance.

19. The processing system of claim 14, wherein said plurality of substantially orthogonal noise templates describe elements of display noise present in said plurality of changes of capacitance.

20. A capacitive sensing input device, comprising:
a capacitive sensor; and
a processing system configured to:
acquire a plurality of changes of capacitance, which include noise components, from a plurality of sensor electrodes in a sensing region of said capacitive sensor;
reduce noise in said plurality of changes of capacitance utilizing, successively and independently, a plurality of substantially orthogonal noise templates,
wherein each of said plurality of substantially orthogonal noise templates comprises a plurality of amplitude values corresponding to said plurality of sensor electrodes; and
determine presence of an input object in said sensing region based on said plurality of changes of capacitance after reducing noise.

21. The capacitive sensing input device of claim 20, wherein reducing noise in said plurality of changes of capacitance comprises: determining an amplitude modifier for each of said plurality of substantially orthogonal noise templates; multiplying each of said plurality of substantially orthogonal noise templates by its respective amplitude modifier to achieve a plurality of amplitude modified substantially orthogonal noise templates; and subtracting said amplitude modified substantially orthogonal noise templates from said changes of capacitance.

22. The capacitive sensing input device of claim 21, wherein said processing system is further configured to:
mask out acquired plurality of capacitive changes that meet a threshold value associated with detection of an input object prior to said amplitude modifier determination.

23. The capacitive sensing input device of claim 20, wherein reducing noise in said plurality of changes of capacitance comprises:
modifying each of said plurality of changes of capacitance with said plurality of substantially orthogonal noise templates which have been fit to a sample capacitive sensor of the same type as said capacitive sensor.

24. The capacitive sensing input device of claim 20, wherein utilizing said plurality of substantially orthogonal noise templates comprises:
approximating each of said plurality of substantially orthogonal noise templates with a sinewave to form a plurality of substantially orthogonal sinewave noise templates; and
subtracting said plurality of substantially orthogonal sinewave noise templates from said plurality of changes of capacitance.

25. The capacitive sensing input device of claim 20, wherein said plurality of substantially orthogonal noise templates describe elements of display noise present in said plurality of changes of capacitance.

* * * * *